United States Patent [19]

Cotner et al.

[11] Patent Number: 5,689,633

[45] Date of Patent: *Nov. 18, 1997

[54] COMPUTER PROGRAM PRODUCT AND PROGRAM STORAGE DEVICE FOR INCLUDING STORED PROCEDURE USER DEFINED FUNCTION OR TRIGGER PROCESSING WITHIN A UNIT OF WORK

[75] Inventors: Curt L. Cotner; Robert J. Heaps, both of Gilroy; Wendy L. Koontz; Benjamin R. Little, both of San Jose; Thomas J. Toomire, Morgan Hill, all of Calif.

[73] Assignee: International Business Machines Corporation, Armonk, N.Y.

[*] Notice: The term of this patent shall not extend beyond the expiration date of Pat. No. 5,553,234.

[21] Appl. No.: 484,311

[22] Filed: Jun. 7, 1995

Related U.S. Application Data

[62] Division of Ser. No. 311,035, Sep. 23, 1994, Pat. No. 5,553,234.

[51] Int. Cl.⁶ .................. G06F 13/00; G06F 13/06
[52] U.S. Cl. ............ 395/182.14; 395/182.15; 395/182.16; 395/200.02; 395/610
[58] Field of Search ................ 395/600, 182.14, 395/610, 200.02, 182.15, 182.16; 364/1

[56] References Cited

U.S. PATENT DOCUMENTS

| | | | |
|---|---|---|---|
| 4,751,635 | 6/1988 | Kret | 364/200 |
| 5,261,069 | 11/1993 | Wilkinson | 395/425 |
| 5,305,434 | 4/1994 | Ballard et al. | 395/155 |
| 5,327,532 | 7/1994 | Ainsworth | 395/200 |
| 5,377,350 | 12/1994 | Skinner | 395/600 |
| 5,379,419 | 1/1995 | Hefferman et al. | 395/600 |
| 5,546,582 | 8/1996 | Brockmeyer et al. | 395/850 |
| 5,553,234 | 9/1996 | Cotner et al. | 395/182.14 |

*Primary Examiner*—Thomas G. Black
*Assistant Examiner*—Jean R. Homere
*Attorney, Agent, or Firm*—Stern, Kessler, Goldstein & Fox P. L. L. C

[57] ABSTRACT

A computer program product and program storage device for incorporating an external predefined procedure into an existing unit of work. The existing unit of work is part of a client application process, wherein the client application process is not able to execute external programs. A logical representation of the client application process is created in a database environment. The logical representation is disconnected from the client application process, and is connected to a procedure operating environment capable of executing external programs. The external predefined procedure is caused to executed in the procedure operating environment. Then, the logical representation is reconnected to the client application process.

15 Claims, 9 Drawing Sheets

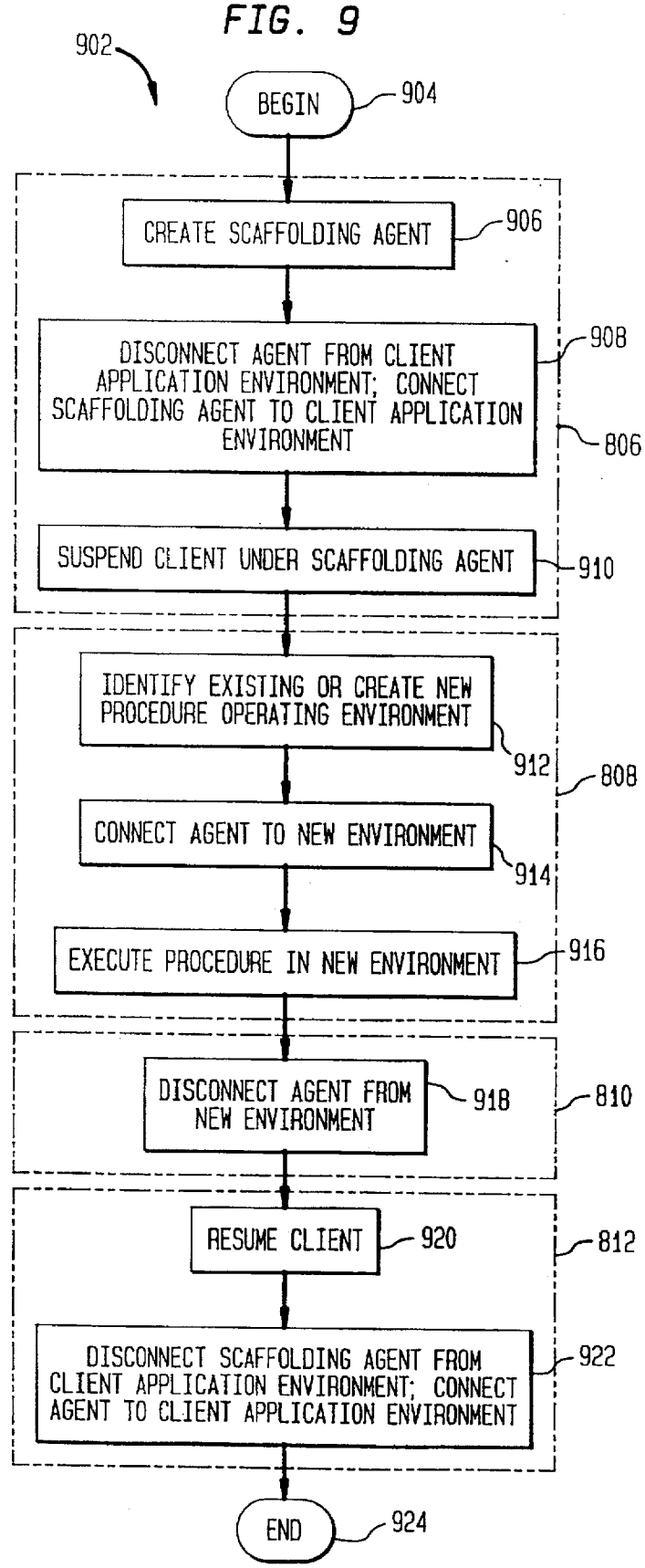

COMPUTER PROGRAM PRODUCT AND PROGRAM STORAGE DEVICE FOR INCLUDING STORED PROCEDURE USER DEFINED FUNCTION OR TRIGGER PROCESSING WITHIN A UNIT OF WORK

This application is a division of application Ser. No. 08/311,035, filed Sep. 23, 1994, now U.S. Pat. No. 5,553,234.

CROSS-REFERENCE TO OTHER APPLICATION(S)

The following application of common assignee is related to the present application, and is believed to have an effective filing date identical with that of the present application:

U.S. Patent Application entitled System and Method For Continuous Destaging of Changed Data In A Multisystem Shared Disk Environment by Gautam Bhargava, Inderpal Narang, and Jim Teng, Attorney Docket No. ST9-94-015, incorporated herein by reference in its entirety.

DESCRIPTION

1. Technical Field

The present invention relates generally to computer database systems, and more particularly to the invocation and execution of stored procedures, user-defined functions, and/or trigger processing in the context of computer database systems.

2. Background Art

Modern relational database management systems (RDBMS) provide interfaces for enabling the invocation of predefined procedures. As used herein, the term "predefined procedure" refers to a procedure that is defined prior to its invocation. Predefined procedures include external stored procedures, user-defined functions, triggers, etc.

External stored procedures are programs that are defined by users of the RDBMS. External stored programs are invoked by the RDBMS when clients attached to the RDBMS issue SQL CALL statements. For example, a client can issue the following SQL statement to cause the RDBMS to run an external stored procedure named PROCX.

EXEC SQL CALL PROCX;

As will be appreciated, SQL (structured query language) is a well known database language produced by International Business Machines (IBM) Corporation. For illustrative purposes, the examples provided herein are expressed in terms of well known SQL statements and syntax, although the concepts and thoughts underlining such examples are applicable to all existing relational database management systems whether they employ SQL or some other database language.

User-defined functions are defined by users. User-defined functions are invoked by the RDBMS during SQL processing. For example, a client can issue the following SQL statement to cause a user-defined function named COMMISSION to be invoked.

EXEC SQL SELECT COMMISSION (SALE_AMOUNT) FROM SALES_TABLE;

Triggers are procedures that are defined by users of the RDBMS. The RDBMS invokes triggers when particular events (associated with the triggers) occur. For example, a trigger can be defined such that it is invoked each time a row is inserted into a particular SQL table.

These predefined procedures (i.e., external stored procedures, user-defined functions, and triggers) may be implemented as either internal programs or external programs. An internal program is a program that executes within the execution environment managed by the RDBMS. An internal program is typically written in an interpretive language supported only within the RDBMS environment.

An external program is a program that executes in an execution environment managed by the operating system. This operating system environment is outside the immediate control of the RDBMS. External programs are typically written in a third generation programming language (e.g., Cobol, C, PL/I, etc.) or a fourth generation (or higher) programming language.

Some relational database management systems support predefined procedures (i.e., external stored procedures, user-defined functions, and triggers) implemented as internal programs. However, conventional relational database management systems do not adequately support predefined procedures implemented as external programs. In particular, conventional relational database management systems do not allow a predefined procedure implemented as an external program to be incorporated into an existing unit of work when any of the following is true: (1) the client application environment is not capable of running an external program; (2) both the client and the execution environment used to run the external program are subject to abrupt termination at any point; and/or (3) the external program is included directly into the unit of work, rather than being included into the unit of work via a two-phase commit procedure.

Accordingly, a need exists for a relational database management system which adequately supports predefined procedures implemented as external programs.

DISCLOSURE OF INVENTION

The present invention is directed to a system and method for allowing a client application process (locally or remotely connected to a relational database management system) to invoke a predefined procedure (i.e., an external stored procedure, user-defined function, and/or trigger) implemented as an external program and have the results of that predefined procedure included in the in-flight unit of work associated with the client application process. The results of the predefined procedure may be committed or rolled back along with the in-flight unit of work.

The present invention operates by temporarily associating the unit of work with a new execution environment that is capable of executing external programs. The predefined procedure is executed in this new execution environment.

The approach of the present invention is superior to systems that use a two-phase commit procedure. This is the case, since the present invention is more efficient (at the RDBMS) in terms of CPU cost. Also, the present invention avoids RDBMS lock conflicts between multiple units of work. Further, the present invention eliminates the need for a two-phase commit procedure between the new execution environment and the existing unit of work (as long as only SQL protected resources are updated in the new execution environment).

The present invention has additional advantages. For example, the present invention insures that abrupt termination of either the new environment and/or the client application process does not adversely affect the integrity of the relational database management system (RDBMS) or RDBMS data, and/or cause termination of the RDBMS.

Also, the present invention enables the RDBMS to invoke a predefined procedure implemented as an external program even when the client application environment is not capable of running external programs. The client application environment may not be capable of running external programs due to limitations associated with the operating system environment, or resource constraints (e.g., lack of available storage within the client application environment).

More particularly, the present invention is directed to a system and method of incorporating an external predefined procedure into an existing unit of work. The existing unit of work is part of a client application process, wherein the client application process is not able to execute external programs. The system of the present invention operates generally as follows. A logical representation of the client application process is created in a database environment. The logical representation is disconnected from the client application process, and is connected to a procedure operating environment capable of executing external programs. The external predefined procedure is caused to executed in the procedure operating environment. Then, the logical representation is reconnected to the client application process.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF DRAWINGS

The present invention will be described with reference to the accompanying drawings, wherein:

FIGS. 8 and 9 depict the operation of the RDBMS according to a preferred embodiment of the present invention.

BEST MODE FOR CARRYING OUT THE INVENTION

The present invention is directed to a system and method for allowing a client application process to invoke an external predefined procedure and have the results of that external predefined procedure included in the in-flight unit of work associated with the client application process. The results of the predefined procedure may be committed or rolled back along with the in-flight unit of work.

As used herein, the term "predefined procedure" refers to a procedure that is defined prior to its invocation. Predefined procedures include external stored procedures, user-defined functions, triggers, etc. An "external predefined procedure" is a predefined procedure that has been implemented as an external program.

The client application process is a client of a database management system. Preferably, the database management system is a relational database management system (RDBMS). In particular, the database management system preferably is the well known IBM Database 2 (DB2) produced by International Business Machines (IBM) Corporation. DB2 utilizes the well known SQL (structured query language) database language for defining and manipulating data in a relational database. However, the present invention is intended and adapted to operate with other types of database management systems, such as relational database management systems other than DB2 which support SQL, relational database management systems which do not support SQL, and non-relational database management systems. In fact, the procedure of the present invention can also be used in non-database operations. The present invention can be used in any applications which employ recoverable resources.

For illustrative purposes, the present invention is sometimes described herein using well known SQL concepts, statements, and syntax. However, this is for convenience purposes only. As indicated above, the present invention is intended and adapted to operate with database management systems which do not support SQL.

Figure 1:
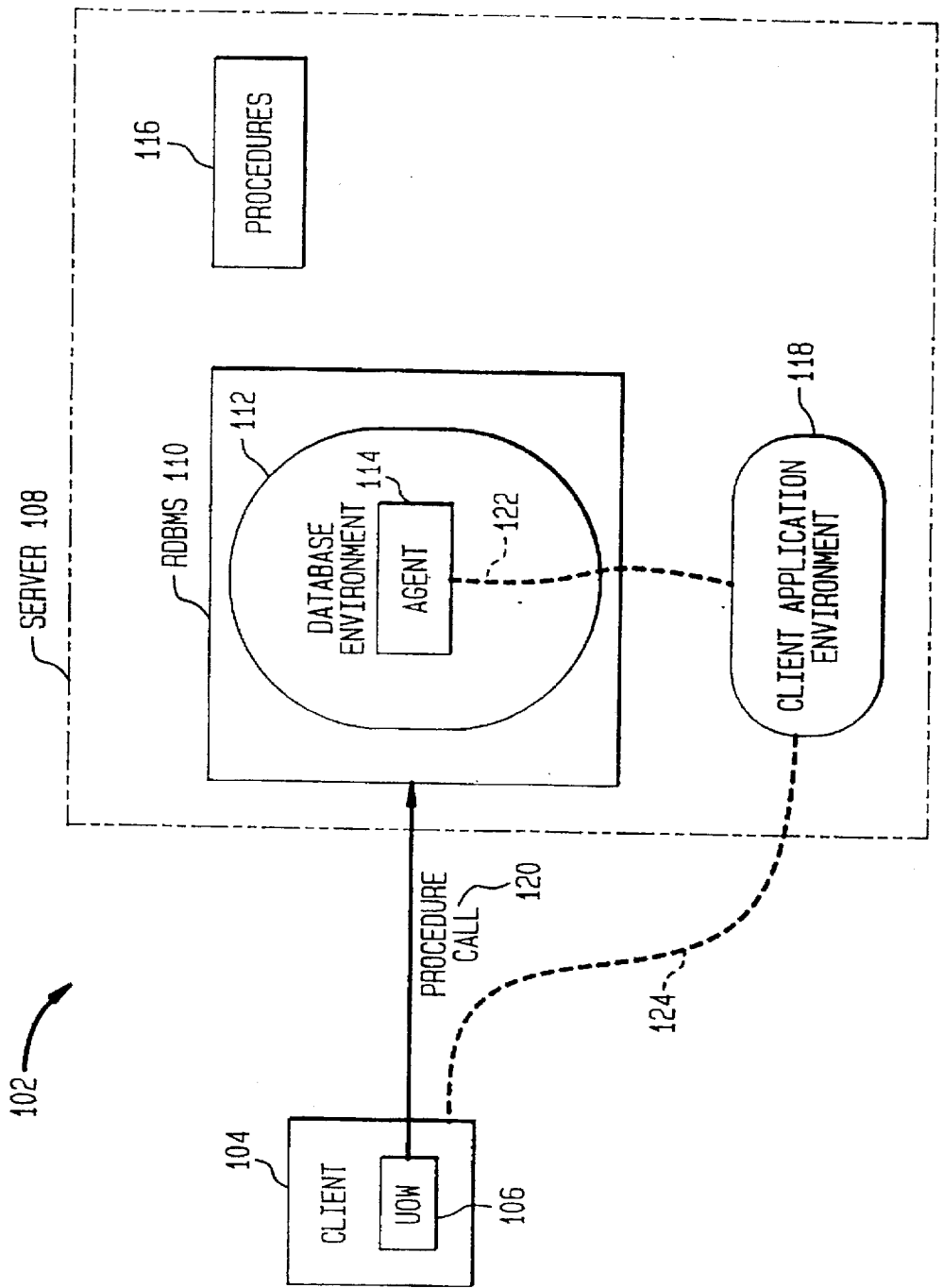
FIGS. 1–6 are used to illustrate the operation of the present invention.

FIG. 1 is a block diagram of a computer system 102. The computer system 102 includes a server 108. The server 108 supports a number of execution environments, such as a database environment 112, that is part of a relational database management system (RDBMS) 110, and a client application environment 118. Computer programs and procedures execute in these execution environments. Stored in the server 108 are a plurality of external predefined procedures 116.

A client application process 104 (also called "client") represents an application program running on a computer platform. This computer platform may be the same as the server 108, or it may be a remote computer platform connected to the server 108 via some type of communication medium, such as a communication network.

Figure 7:
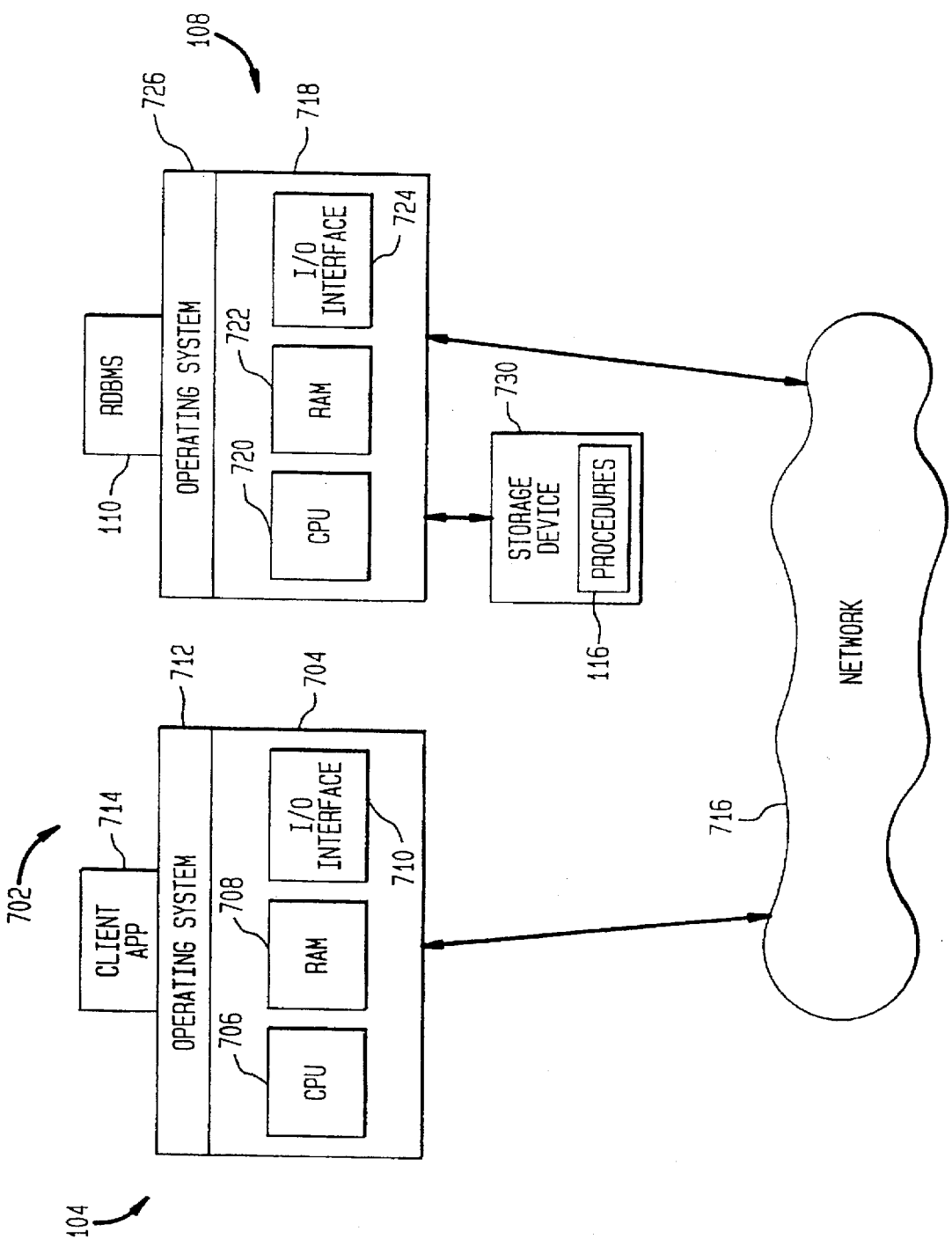
FIG. 7 is a block diagram of a client and a relational database management system (RDBMS) according to a preferred embodiment of the present invention.

As shown in FIG. 7, the server 108 is preferably implemented as a relational database management system (RDBMS) subsystem 110 operating on a computer platform comprising a computer 718 and an operating system 726. The computer 718 includes various hardware components, such as one or more central processing units (CPU) 720, a random access memory (RAM) 722, and an input/output (I/O) interface 724.

Preferably, the RDBMS subsystem 110 is the well known IBM Database 2 (DB2) computer program produced by International Business Machines (IBM) Corporation. The computer 718 is preferably the well known System/390 family of computers produced by IBM. The operating system 726 is preferably the well known MVS/ESA (Multiple Virtual Storage System/Enterprise Systems Architecture) operating system produced by IBM. It should be understood, however, that other computers and operating systems could alternatively be used without departing from the scope and spirit of the present invention.

The computer 718 is connected to a number of peripheral devices, such as one or more storage devices. The storage devices may represent floppy drive units, hard drive units, tape backup units, etc. One such storage device, designated using reference number 730, is shown in FIG. 7. Stored in this storage device 730 are the external predefined procedures 116. These external predefined procedures 116 could also be stored in the RAM 722.

A computer program product comprising a computer readable media having computer program logic recorded thereon, wherein the computer program logic when executed in the computer 718 enables the computer 718 to perform the functions of the present invention, may be read by and/or stored on the storage device 730. The computer program logic may then be loaded into the RAM 722, and executed by the CPU 720 of the computer 718. When executing in the CPU 720, the computer program logic is represented by the RDBMS subsystem 110 as shown in FIG. 7.

Still referring to FIG. 7, the client 104 is preferably implemented as a client application program 714 operating on a computer platform comprising a computer 704 and an operating system 712. The computer 712 includes various hardware components, such as one or more central processing units (CPU) 706, a random access memory (RAM) 708, and an input/output (I/O) interface 710. The client application program 714 includes instructions for defining and manipulating data in relational databases maintained by the RDBMS 110. Preferably, these instructions are defined by SQL. The computer 704 and the operating system 722 may be implemented using any components suitable for executing the client application program 714.

The computers 704 and 718 are connected to a communication network 716, such as a local area network (LAN) or a wide area network (WAN). The client 104 and the server 108 communicate with each other over this network 716.

In an alternate embodiment of the present invention, the client application program 714 and the RDBMS subsystem 110 both execute on the same computer platform.

Referring again to FIG. 1, the client 104 includes a plurality of unit of works (UOWs). One of these UOWs is shown and designated in FIG. 1 using reference number 106. "Unit of work" is a well known computer database term. A unit of work is a recoverable sequence of operations within a process, such as the client application process 104 (in other words, a unit of work is a recoverable resource). At any time, a process is represented by a single unit of work, but the life of the process can involve many units of work as a result of commit and/or rollback operations. The current (existing) unit of work (i.e., the unit of work that is currently executing) is sometimes called herein the "in-flight unit of work".

A unit of work is started by the initiation of a process or by the termination of a previous unit of work. A unit of work is terminated by a commit operation, a rollback operation, or the termination of the process. Commit and rollback operations affect only the results of operations executed within the unit of work. Uncommitted database changes made in a unit of work cannot be perceived by other processes and can be backed out (using a rollback operation). Committed database changes can be perceived by other processes and cannot be backed out.

As is well known, computer systems that manage recoverable resources (such as units of work) must have a mechanism to logically represent a client application process and the recoverable resources associated with the client application process. In the present invention, this mechanism is achieved by use of agents.

The agents are maintained in the database environment 112. An agent is associated with each client application process (the agent is said to logically represent the client application process within the database environment 112). For example, in FIG. 1, agent 114 is associated with the client 104.

The information maintained by agents is implementation dependent. In the present invention, each agent preferably includes:

- An unit of work identifier associated with the client application process's unit of work.
- A lock token used to acquire new locks in the RDBMS 110 for the unit of work associated with the client application process.
- Information required to locate RDBMS log records associated with the application process's current unit of work.
- RDBMS authorization information associated with the client application process.
- The content of SQL special registers in the client application process.
- The content of the data areas associated with the current SQL statement being processed by the RDBMS 110 on behalf of the client application process (SQLDA, SQLCA, host variables, etc.)
- Information describing the operating environment of the client application process, so that the RDBMS 110 can relate abnormal termination of the client application process to the corresponding unit of work within the RDBMS 110.

The RDBMS 110 builds the agent 114 for the client 104 in a well known manner when the client 104 connects to the RDBMS 110 for service. Part of this connection process includes activating services within the operating system 726 to notify the RDBMS 110 when the client 104 terminates. An abrupt termination of the client 104 causes the RDBMS 110 to roll back the in-flight unit of work 106. Also at this time, the RDBMS 110 establishes in a well known manner a client application execution environment 118. Processing which the RDBMS 110 performs on behalf of the client 104 is performed in this client application environment 118 (except as discussed below). The client application environment 118 is associated with the client 104 as represented by line 124. The client application environment 118 is also associated with the agent 114 (as represented by line 122), such that the RDBMS 110 can monitor for abnormal termination of the client 104 and/or the client application environment 118 (if either abnormally terminates, then it will be necessary to rollback the in-flight unit of work).

The client 104 interacts with the RDBMS 110 by issuing SQL statements. These SQL statements are communicated to the RDBMS 110. For example, as shown in FIG. 1, the client 104 may issue a procedure call 120 which instructs the RDBMS 110 to execute one of the external predefined procedures 116.

Normally, the RDBMS 110 invokes and executes this external predefined procedure 116 from within the client application environment 118. However, there are circumstances under which this is not possible. For example, it would not be possible to invoke and execute the external predefined procedure 116 from within the client application environment 118 if the MVS operating system 726 (FIG. 7) is operating in the well known SRB (schedule request block) mode with respect to the client application environment 118. As will be appreciated by persons skilled in the relevant art, when running in SRB mode, it is not possible to invoke the operating system functions necessary to invoke and execute external predefined procedures.

Also, it would not be possible to invoke and execute the external predefined procedure 116 from within the client application environment 118 if sufficient resources were not allocated to the client application environment 118. For example, the client application environment 118 may not have sufficient storage space to execute the external predefined procedure 116.

When this occurs (i.e., when it is not possible to invoke and execute the external predefined procedure 116 from within the client application environment 118), the RDBMS 110 (in accordance with the present invention) temporarily associates the in-flight unit of work 106 with a new execution environment that is capable of executing external programs. This new execution environment is established in the server 108. The external predefined procedure 116 is executed in this new execution environment.

Figure 8:
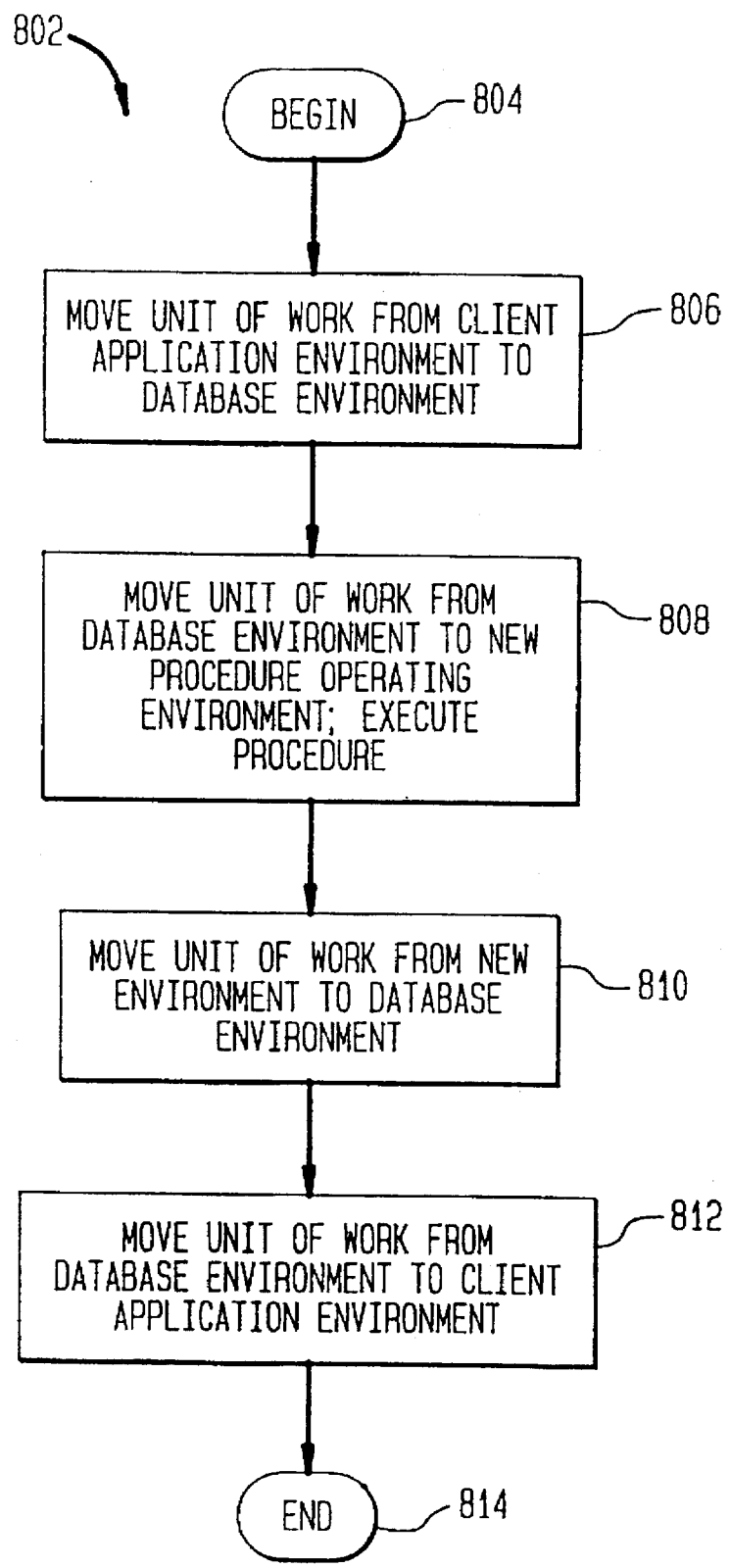

More particularly, and with reference to a flowchart 802 in FIG. 8, the RDBMS 110 first logically moves the unit of work 106 from the client application environment 118 to the database environment 112 (step 806). Then, the RDBMS 110 logically moves the unit of work 106 from the database environment 112 to a new execution environment, called the procedure operating environment 302 (see FIG. 4). This is represented by step 808 in FIG. 8. The external predefined procedure 116 is invoked and executed in this procedure operating environment 302. After execution of the external predefined procedure 116 completes, the RDBMS 110 logically moves the unit of work 106 from the procedure operating environment 302 to the database environment 112 (step 810). Finally, the RDBMS 110 logically moves the unit of work 106 from the database environment 112 to the client application environment 118 (step 812).

In each of steps 806, 808, 810, and 812, the RDBMS 110 moves the unit of work 106 from a source environment to a destination environment. In each case, the database environment 112 is either the source environment or the destination environment. Both the client application environment 118 and the procedure operating environment 302 are subject to abrupt termination at any time. Thus, by ensuring that the database environment 112 is either the source or the destination during each of the above-described steps, the present invention ensures that data consistency is maintained. This is described further below.

The manner in which the RDBMS 110 invokes and executes an external predefined procedure 116 shall now be described in greater detail with reference to a flowchart 902 shown in FIG. 9. Reference shall also be made to FIGS. 2-6, which illustrate different states of the computer system 102.

The procedure represented in flowchart 902 is performed when the client 104 is not capable of executing external programs. This is the case when the client application environment 118 associated with the client 104 is not capable of executing external programs.

In flowchart 902, steps 906, 908, and 910 generally correspond to step 806 in FIG. 8. Steps 912, 914, and 916 generally correspond to step 808. Step 918 generally corresponds to step 810. Steps 920 and 922 generally correspond to step 812. The flowchart 902 (and all flowcharts contained herein) is of sufficient detail to enable one skilled in the relevant art to generate a computer program or a computer program product in accordance with the present invention. Flowchart 902 starts with step 904, where control immediately passes to step 906.

Figure 2:
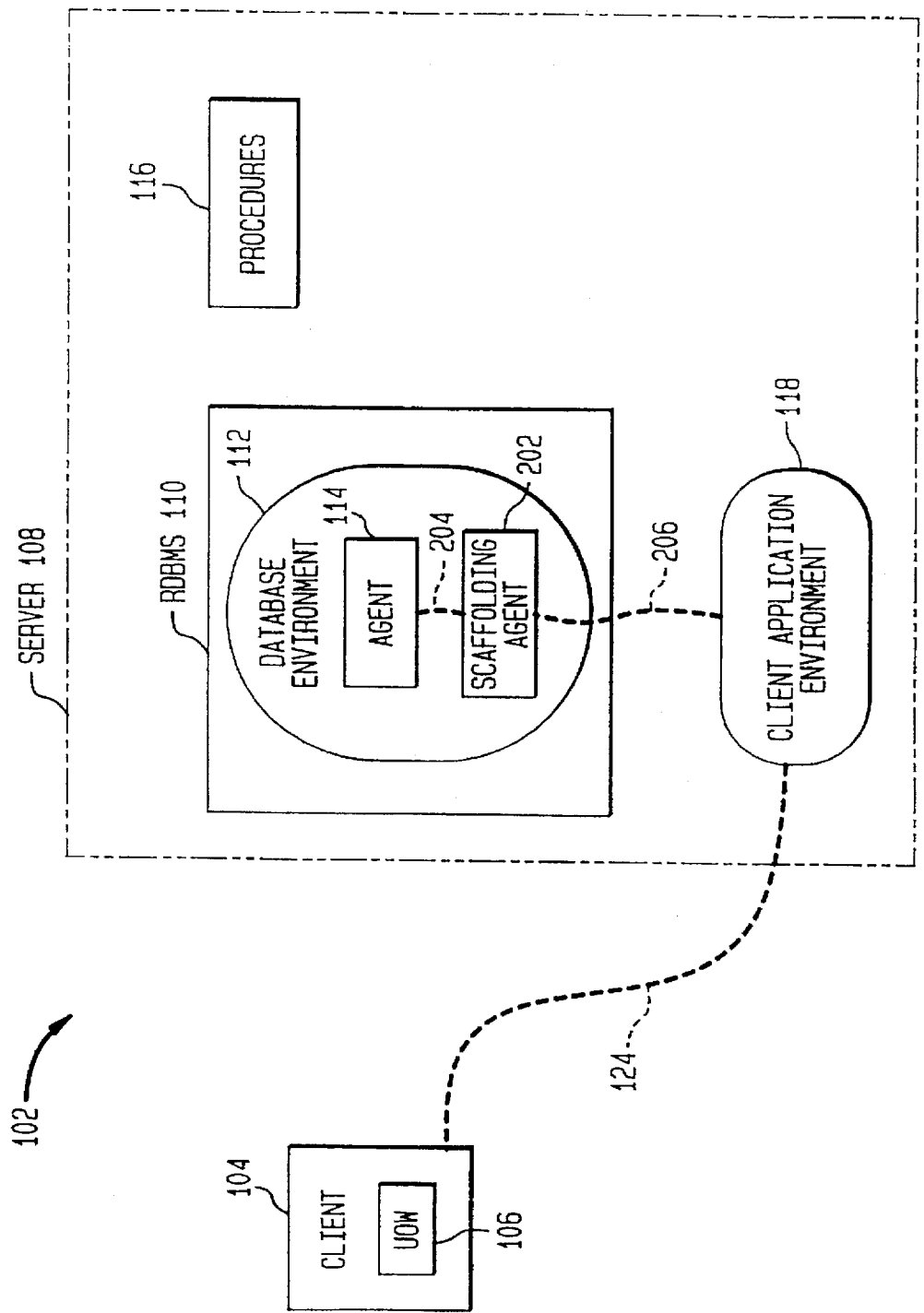
Figure 3:
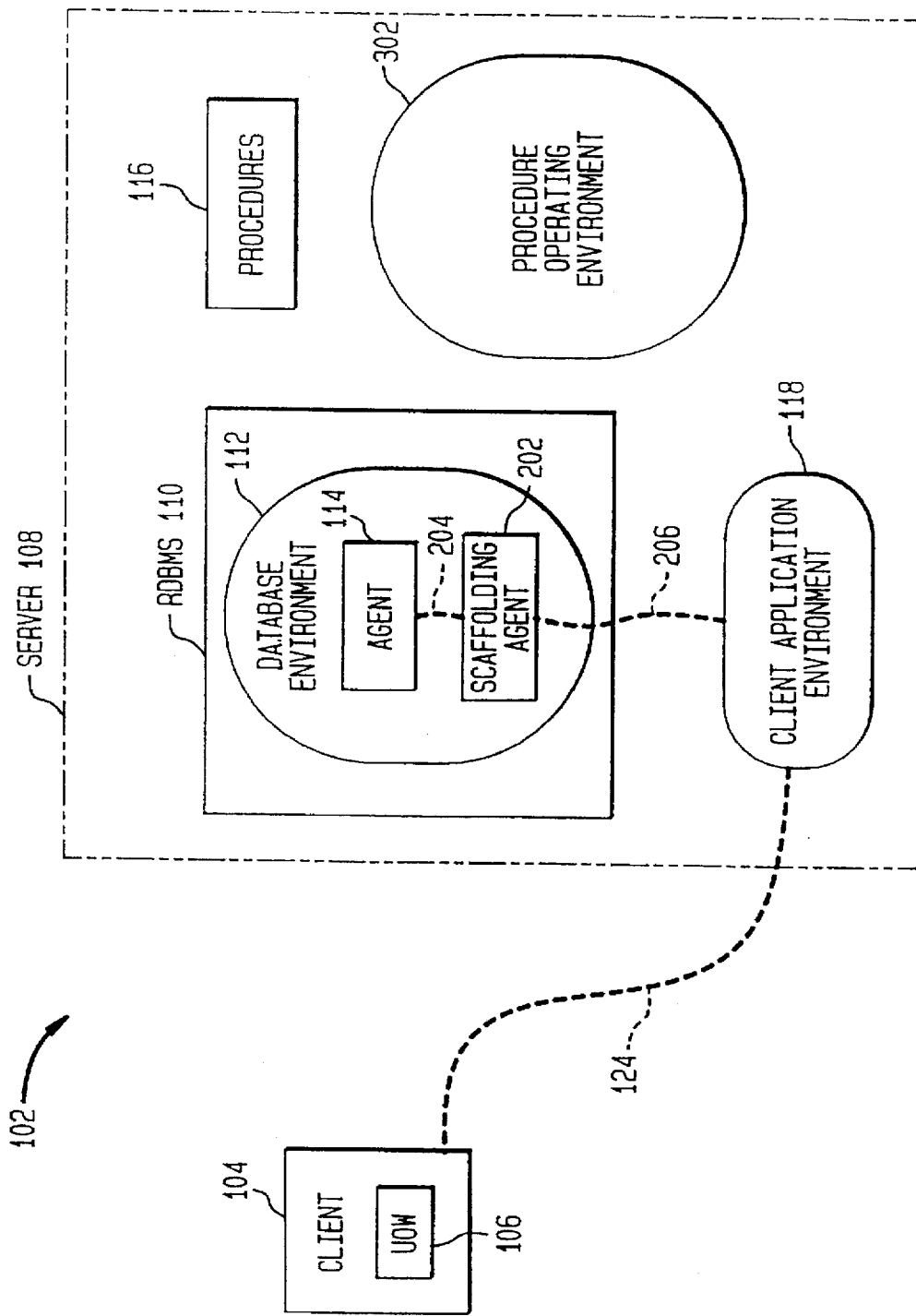

In step 906, the RDBMS 110 creates a scaffolding agent structure 202 (see FIG. 2). Note that the scaffolding agent 202 is logically contained within the database environment 112. The scaffolding agent 202 is used to preserve the ability of the RDBMS 110 to monitor abnormal termination of the client 104, while the "real" agent 114 is temporarily relocated to another environment (as described below). All agents have the same data structure. Accordingly, the scaffolding agent 202 has the same data structure as the real agent 114.

The scaffolding agent 202 is preferably very similar to the real agent 114. However, they differ in the way they are used. The real agent 114 is used to process SQL requests from the client 104 and the stored procedure 306. The scaffolding agent 202 is used only as a place holder. The scaffolding agent 202 is not used for SQL processing. The RDBMS 110 can make the scaffolding agent 202 physically different from the real agent 114, or physically the same as the real agent 114.

In step 908, the RDBMS 110 disconnects the real agent 114 from the client 104. This is done by disconnecting the real agent 114 from the client application environment 118. The real agent 114 is disconnected from the client application environment 118 by updating appropriate fields in the data structure of the real agent 114.

Also in step 908, the RDBMS 110 connects the scaffolding agent 202 to the client 104. This is done by connecting the scaffolding agent 202 to the client application environment 118 (as represented by line 206). The scaffolding agent 202 is connected to the client application environment 118 by updating appropriate fields in the data structure of the scaffolding agent 202. The disconnection of the agent 114 from the client application environment 118, and the connection of the scaffolding agent 202 to the client application environment 118, results in the unit of work 106 being logically moved from the client application environment 118 to the database environment 112.

Further in step 908, the RDBMS 110 updates appropriate fields of the scaffolding agent 202 to mark the scaffolding agent 202 as being logically related to the real agent 114 (as represented by line 204). In a similar manner, the real agent 114 is marked so that it is logically related to the scaffolding agent 202. If the client 104 terminates abnormally after step 908 is complete, the RDBMS 110 uses the scaffolding agent 202 to find the associated real agent 114 (via the link represented by line 204), and forces the abnormal termination of the real agent 114. The net effect of this will cause the unit of work 106 to roll back, even if the real agent 114 is in the midst of executing a external predefined procedure at the time of the abnormal termination of the client 104.

In step 910, the RDBMS 110 suspends the client 104 under the scaffolding agent 202, to wait for the completion of the requested external predefined procedure (this external predefined procedure was requested, for example, via the procedure call 120 shown in FIG. 1).

In step 912, the RDBMS 110 creates in a well known manner a new operating environment that is capable of executing external programs. The manner in which new operating environments are created is operating system dependent, and is well known for well known operating systems, such as the MVS operating system. The new operating environment is called the procedure operating environment 302 (see FIG. 4). As described below, the procedure operating environment 302 is used to execute the requested external predefined procedure. Alternatively in step 912, the RDBMS 110 locates an existing operating environment (capable of executing external programs) that can be reused.

In step 914, the RDBMS 110 modifies the real agent 114 so that it is connected to the procedure operating environment 302. This is represented by line 304 in FIG. 4. Once this connection is established, the RDBMS 110 can monitor for abnormal termination of the procedure operating environment 302. If the procedure operating environment 302 terminates abnormally, then the agent 114 is used to associate the abnormal termination of the procedure operating environment 302 with the unit of work 106, such that the RDBMS 110 can force abnormal termination of the related scaffolding agent 202 and the client 104. The connection of the agent 114 to the procedure operating environment 302 results in the unit of work 106 being logically moved from the database environment 112 to the procedure operating environment 302.

Figure 4:
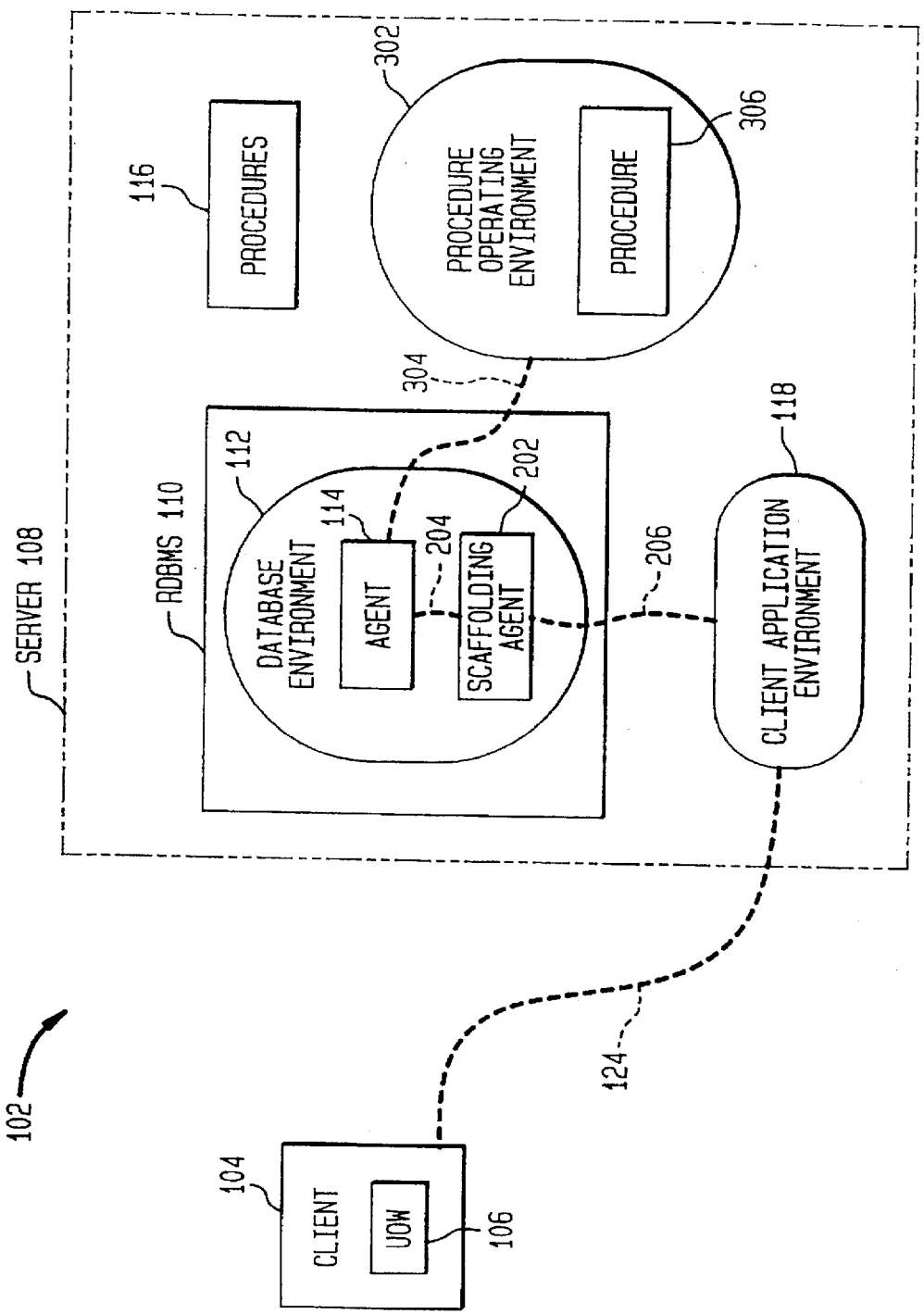

In step 916, the RDBMS 110 invokes and executes the requested external predefined procedure from within the procedure operating environment 302. This external predefined procedure is represented in FIG. 4 using reference number 306. All database operations performed within the procedure operating environment 302 are associated with the agent 114. For example, all locks acquired within the RDBMS 110 during the execution of the external predefined procedure 306 in the procedure operating environment 302 become part of the in-flight unit of work 106. Also, any RDBMS log records written while the procedure operating environment 302 is in use will contain the same correlation information that would have appeared if the log records were written while in the client application environment 118. As described below, the agent 114 is eventually re-connected to the client 104. As a result, the present invention operates to incorporate an external predefined procedure in an existing (in-flight) unit of work.

Figure 5:
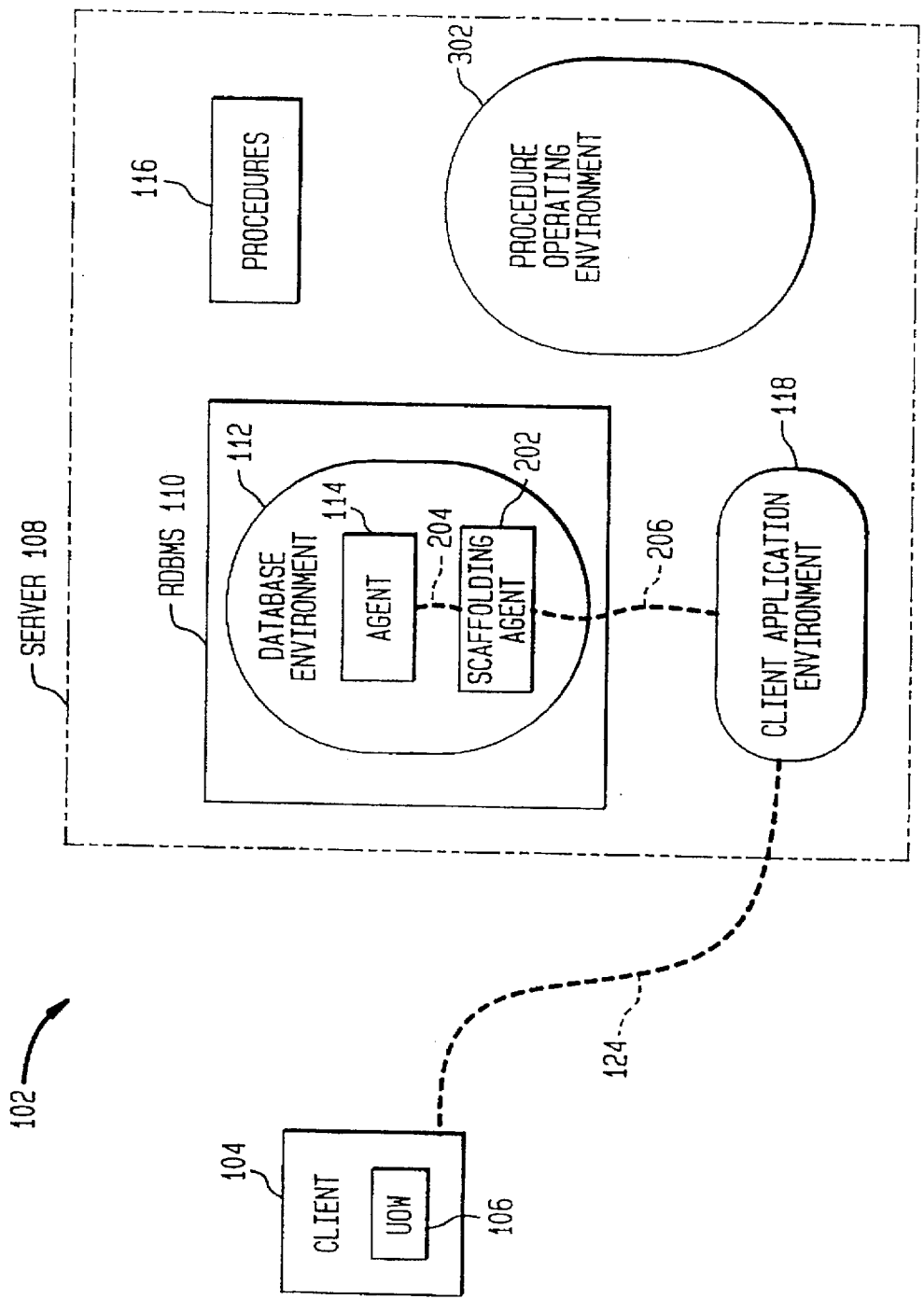
Figure 6:
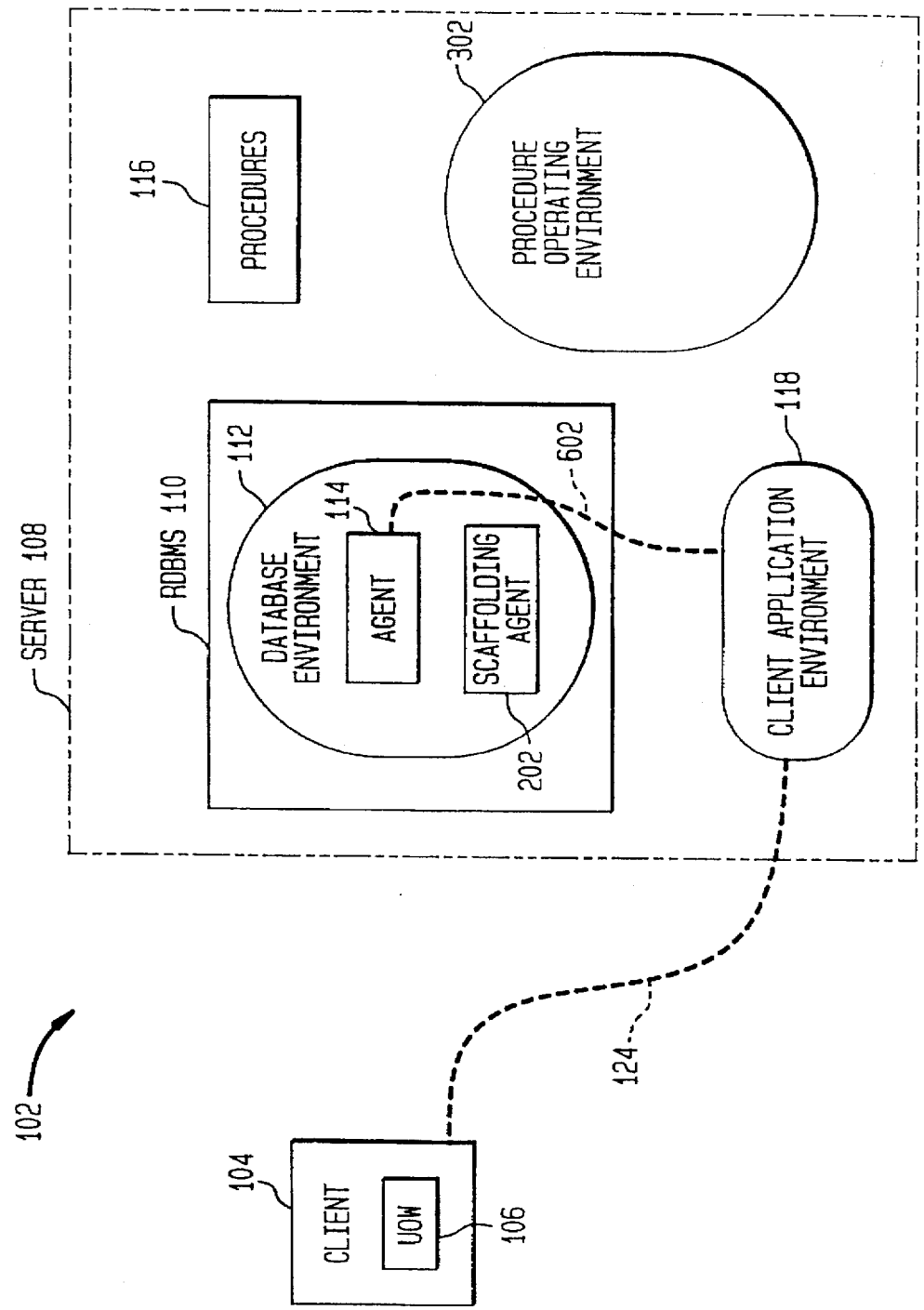

Upon completion of the external predefined procedure 306, the RDBMS 110 in step 918 modifies the agent 114 to disconnect the agent 114 from the procedure operating environment 302 (see FIG. 5). The disconnection of the agent 114 from the procedure operating environment 302 results in the unit of work 106 being logically moved from the procedure operating environment 302 to the database environment 112.

In step 920, the RDBMS 110 resumes the client 104 that is running under the scaffolding agent 202. Then, the RDBMS 110 notifies the client 104 that the request (i.e., the procedure call 120, for example) is complete.

In step 922, the RDBMS 110 disconnects the scaffolding agent 202 from the client 104 (i.e., from the client application environment 118), and connects the real agent 114 to the client 104 (i.e., to the client application environment 118. This connection is represented by line 602 in FIG. 6. This process includes modifying the real agent 114 so that the RDBMS 110 is once again able to monitor for abnormal termination of the client 104 by reference to the agent 114. The connection of the agent 114 to the client application environment 118 results in the unit of work 106 being logically moved from the database environment 112 to the client application environment 118.

Now that the real agent 114 is reconnected to the client 104, the client 104 can continue performing database operations (preferably SQL operations). The effects of all SQL operations performed within the external predefined procedure 306 are included in the in-flight unit of work 106 associated with the client 104. Accordingly, the external predefined procedure 306 has been incorporated into the in-flight unit of work 106. COMMIT and ROLLBACK operations will treat these SQL operations as if they were performed directly under the client 104 (within the client application environment 118).

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A program storage device readable by a machine, tangibly embodying a program of instructions executable by the machine to perform method steps for incorporating an external predefined procedure into an existing unit of work, said existing unit of work being part of a client application process, said method steps comprising:

(a) creating, in a database environment, a "logical representation" of said client application process, that is connected to said client application process;

(b) disconnecting said "logical representation" from said client application process;

(c) connecting said "logical representation" to a procedure operating environment to execute external programs;

(d) executing said external predefined procedure in said procedure operating environment;

(e) disconnecting said "logical representation" from said procedure operating environment; and (f). reconnecting said "logical representation" to said client application process, to incorporate the external predefined procedure into the existing unit of work.

2. The program storage device of claim 1, wherein said client application process and said procedure operating environment abruptly terminate.

3. The program storage device of claim 2, further comprising the following steps performed between steps (a) and (b)

creating, in said database environment, a scaffolding agent; and connecting said scaffolding agent to said client application process, such that said scaffolding agent monitors termination of said client application process.

4. The program storage device of claim 3, further comprising the following step performed between steps (e) and (f):

disconnecting said scaffolding agent from said client application process.

5. The program storage device of claim 2, wherein method step (c) comprises the method step of:

modifying said logical representation such that termination of said procedure operating environment may be monitored via said logical representation.

6. The program storage device of claim 1, wherein said external predefined procedure comprises one of an external stored procedure, a user-defined function, and a trigger.

7. The program storage device of claim 1, wherein method step (d) comprises the method step of:

associating all operations performed during execution of said external predefined procedure with said existing unit of work via said logical representation connected to said procedure operating environment.

8. The program storage device of claim 1, wherein method step (d) comprises the method step of:

associating at least one lock created during execution of said external predefined procedure with said existing unit of work via said logical representation connected to said procedure operating environment.

9. A computer program product for use in a data processing system having a first computer system, a client application process running in the first computer system, said client application process having an in-flight unit of work, and a second computer system coupled to said first computer system, said second computer system supporting a database environment, a database system executing in said database environment, said second computer system also supporting a client application environment that cannot execute external programs, said computer product comprising:

a computer usable medium having computer readable program code means embodied in said medium for causing a computer to incorporate an external predefined procedure into an existing unit of work, said existing unit of work being part of a client application process, said computer readable program code means comprising:

computer program code means for creating, in said database environment, a "logical representation" of said client application process that is connected to said client application process;

computer program code means for disconnecting said "logical representation" from said client application environment;

computer program code means for creating a procedure operating environment in said second computer system to execute external procedures;

computer program code means for connecting said "logical representation" to said procedure operating environment;

computer program code means for executing an external predefined procedure in said procedure operating environment;

computer program code means for disconnecting said "logical representation" from said procedure operating environment; and computer program code means for reconnecting said "logical representation" to said client application environment, thereby incorporating the external predefined procedure into the existing unit of work.

10. The computer product of claim 9, wherein said client application process and said procedure operating environment abruptly terminate.

11. The computer program product of claim 10, wherein said computer program code means further comprises:

computer program code means for creating, in said database environment, a scaffolding agent; and computer program code means for connecting said scaffolding agent to said client application process, such that termination of said client application process may be monitored via said scaffolding agent.

12. The computer program product of claim 10, wherein said computer program code means for connecting said logical representation to said procedure operating environment comprises computer program code means for modifying said logical representation such that termination of said procedure operating environment may be monitored via said logical representation.

13. The computer program product of claim 9, wherein said computer program code means for executing an external predefined procedure in said procedure operating environment comprises computer program code means for associating all operations performed during execution of said external predefined procedure with said existing unit of work via said logical representation connected to said procedure operating environment.

14. The computer program product of claim 9, wherein said first and second computer systems are implemented using a single computer platform.

15. A computer program product comprising a computer readable medium having computer program code means recorded thereon for enabling a computer system to incorporate an external predefined procedure into an existing unit of work, said existing unit of work being part of a client application process, said computer program code means comprising:

computer program code means for enabling said computer system to create, in database environment, a "logical representation" of said client application process that is connected to said client application process;

computer program code means for enabling said computer system to disconnect said "logical representation" from said client application process;

computer program code means for enabling said computer system to connect said "logical representation" to a procedure operating environment;

computer program code means for enabling said computer system to execute said external predefined procedure in said procedure operating environment;

computer program code means for enabling said processor to disconnect said "logical representation" from said procedure operating environment; and computer program code means for enabling said computer system to reconnect said "logical representation" to said client application environment, thereby incorporating the external predefined procedure into the existing unit of work.

* * * * *